US009269948B2

United States Patent
Sato (10) Patent No.: US 9,269,948 B2
(45) Date of Patent: Feb. 23, 2016

(54) POSITIVE ELECTRODE ACTIVE MATERIAL, PROCESS FOR PRODUCING SAME, AND LITHIUM SECONDARY BATTERY USING SAME

(75) Inventor: Shigeki Sato, Fuji (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 250 days.

(21) Appl. No.: 13/885,169

(22) PCT Filed: Nov. 16, 2010

(86) PCT No.: PCT/JP2010/070382
§ 371 (c)(1),
(2), (4) Date: May 14, 2013

(87) PCT Pub. No.: WO2012/066638
PCT Pub. Date: May 24, 2012

(65) Prior Publication Data
US 2013/0236787 A1    Sep. 12, 2013

(51) Int. Cl.
*H01M 4/131* (2010.01)
*H01M 4/505* (2010.01)
(Continued)

(52) U.S. Cl.
CPC .............. *H01M 4/131* (2013.01); *C01G 45/006* (2013.01); *C01G 45/1228* (2013.01); *C01G 49/009* (2013.01); *C01G 51/006* (2013.01); *C01G 51/42* (2013.01); *C01G 51/50* (2013.01); *C01G 53/006* (2013.01); *C01G 53/42* (2013.01);
(Continued)

(58) Field of Classification Search
CPC .................................................. H01M 4/5825
See application file for complete search history.

(56) References Cited

U.S. PATENT DOCUMENTS

2008/0026292 A1* 1/2008 Paulsen et al. ............. 429/231.3
2008/0116418 A1 5/2008 Tabuchi et al.
(Continued)

FOREIGN PATENT DOCUMENTS

JP   10-251020    9/1998
JP   2008-127233  6/2008
(Continued)

OTHER PUBLICATIONS

Prabaharan et al., Li2NiTiO4—A new positive electrode for lithium batteries: soft chemicstry synthesis and electrochemical characterization, Jan. 21, 2004, Solid State Ionics 172 (2004), pp. 39-40.*
(Continued)

*Primary Examiner* — Barbara Gilliam
*Assistant Examiner* — Nathanael Zemui
(74) *Attorney, Agent, or Firm* — Finnegan, Henderson, Farabow, Garrett & Dunner, LLP (57) ABSTRACT

An object of the present invention is to provide a high-capacity, low cycle deterioration lithium secondary battery in which the positive electrode is provided with a titanium composite oxide such as $Li_2NiTiO_4$. A lithium secondary battery 100 provided by the present invention includes a positive electrode 10 and a negative electrode 20. The positive electrode 10 has a solid solution between $Li_2M1TiO_4$ (where M1 is at least one metal element selected from the group consisting of Mn, Fe, Co, and Ni) and $LiM2O_2$ (where M2 is at least one metal element selected from the group consisting of Mn, Co, and Ni).

8 Claims, 4 Drawing Sheets

(51) Int. Cl.
  *H01M 4/525* (2010.01)
  *C01G 45/00* (2006.01)
  *C01G 45/12* (2006.01)
  *C01G 49/00* (2006.01)
  *C01G 51/00* (2006.01)
  *C01G 53/00* (2006.01)
  *H01M 4/485* (2010.01)

(52) U.S. Cl.
  CPC .............. *C01G 53/50* (2013.01); *H01M 4/505* (2013.01); *H01M 4/525* (2013.01); *C01P 2006/40* (2013.01); *H01M 4/485* (2013.01); *Y02E 60/122* (2013.01)

(56) References Cited

U.S. PATENT DOCUMENTS

2008/0161602 A1* 7/2008 Wang et al. .................... 562/549
2013/0017449 A1   1/2013 Yasuda et al.

FOREIGN PATENT DOCUMENTS

| JP | 2008-288005 | 11/2008 |
| JP | 2009-190954 | 8/2009 |
| JP | 2009-224097 | 10/2009 |
| JP | 2011/233234 | 11/2011 |
| WO | WO 2009/140501 A1 | 11/2009 |

OTHER PUBLICATIONS

S. Prabaharan et al., "$Li_2NiTiO_4$—A New Positive Electrode for Lithium Batteries: Soft-Chemistry Synthesis and Electrochemical Characterization," Solid State Ionics, vol. 172, pp. 39-45 (2004).

M. Küzma et al., "Electrochemical Activity of $Li_2FeTiO_4$ and $Li_2MnTiO_4$ as Potential Active Materials for Li Ion Batteries: A Comparison with $Li_2NiTiO_4$," Journal of Power Sources, vol. 189, pp. 81-88 (2009).

* cited by examiner

POSITIVE ELECTRODE ACTIVE MATERIAL, PROCESS FOR PRODUCING SAME, AND LITHIUM SECONDARY BATTERY USING SAME

CROSS-REFERENCE TO RELATED APPLICATIONS

This application is a national phase application of International Application No. PCT/JP2010/070382, filed Nov. 16, 2010, the content of which is incorporated herein by reference.

TECHNICAL FIELD

The present invention relates to a positive electrode active material, a process for producing the same, and a lithium secondary battery that uses this positive electrode active material.

BACKGROUND ART

Rechargeable batteries, also known as secondary batteries, have in recent years become increasingly important as vehicle-mounted power sources and as power sources for personal computers and mobile devices. In particular, lithium secondary batteries (typically a lithium ion secondary battery), which are lightweight and provide a high energy density, are expected to be preferentially used as large, vehicle-mounted power sources. In this type of lithium secondary battery, charge and discharge proceed through exchange of lithium (Li) ions between the positive electrode and negative electrode that are constituent components of the battery, and the positive electrode material (the positive electrode active material) is the most important component for determining battery performance. For example, the discharge capacity is determined by how much Li ion can be inserted into and extracted from the positive electrode active material.

Due to this, various investigations have been carried out in pursuit of positive electrode active materials that can be expected to realize higher discharge capacities (for example, Patent Literature 1). Titanium composite oxides, e.g., $Li_2NiTiO_4$ and $Li_2MnTiO_4$, are one example of such positive electrode active materials. For example, the titanium composite oxide represented by $Li_2NiTiO_4$ has a theoretical capacity of around 150 mAh/g for the one-electron reaction, but since a two-electron reaction is possible here, it can be expected to achieve a capacity as high as about 300 mAh/g in such a case.

CITATION LIST

[Patent Literature]
Patent Literature 1: Japanese Patent Application Laid-open No. H10-251020

SUMMARY OF INVENTION

However, a titanium composite oxide such as $Li_2NiTiO_4$, because it forms a rock salt-type crystal structure belonging to the space group Fm-3m, is from a structural standpoint unfavorable for Li ion diffusion and the electronic conductivity of the material itself is also very low. Due to this, the lithium in the titanium composite oxide cannot be thoroughly extracted and there are limits on the extent to which the capacity can be raised. In addition, there is a problem in that the crystal structure is unstable and is destroyed accompanying Li ion insertion/extraction during charge/discharge, and as a result cycle deterioration easily occurs.

An object of the present invention is therefore to provide a high-capacity, low cycle deterioration lithium secondary battery in which the positive electrode is provided with a titanium composite oxide such as $Li_2NiTiO_4$. A further object is to provide an advantageous process for producing a lithium secondary battery that has such characteristics.

As a result of intensive investigations in order to achieve the objects indicated above, the present inventor discovered that the Li ion diffusivity and the electronic conductivity can be substantially improved by dissolving a lithium-transition metal composite oxide with a layered rock salt-type structure in a titanium composite oxide such as $Li_2NiTiO_4$ to form a solid solution, and that as a result more of the lithium in this titanium composite oxide can be extracted. The present invention was achieved based on this discovery.

Thus, the lithium secondary battery provided by the present invention includes a positive electrode and a negative electrode, wherein the positive electrode contains a solid solution between a first oxide represented by the following formula (1)

$$Li_2M1TiO_4 \qquad (1)$$

(where M1 is at least one metal element selected from the group consisting of Mn, Fe, Co, and Ni)
and a second oxide represented by the following formula (2)

$$LiM2O_2 \qquad (2)$$

(where M2 is at least one metal element selected from the group consisting of Mn, Co, and Ni).

This solid solution is formed by the dissolution of the $LiM2O_2$ having a layered rock salt-type structure in the titanium composite oxide $Li_2M1TiO_4$. This results in the introduction of Li ion diffusion channels within the original structure of the $Li_2M1TiO_4$ and also in the generation of electronic conductivity. As a consequence, more of the lithium in the $LiM1TiO_4$ can be extracted than in the absence of dissolution of the $LiM2O_2$ and the amount of lithium utilizable for charge/discharge can be increased. In addition, due to the dissolution of the $LiM2O_2$, the crystal structure is stabilized and the strains caused by Li ion insertion and extraction during charge/discharge are relaxed. This results in a lessening of the deterioration in performance associated with charge/discharge. The use of this positive electrode active material makes possible the fabrication of a high-performance lithium secondary battery that has a high capacity and that exhibits little cycle deterioration.

The proportion of dissolution of the $LiM2O_2$ in the $Li_2M1TiO_4$ should enable the $LiM2O_2$ and the $Li_2M1TiO_4$ to form a composition that is an indivisible single mass, but is not otherwise particularly limited, and the proportion of dissolution of the $LiM2O_2$ in the $Li_2M1TiO_4$ can be selected as appropriate in conformity with the objects of the present invention. However, the molar content of the $Li_2M1TiO_4$ in the overall solid solution is suitably about at least 50 mol % and is preferably at least 60 mol %, more preferably at least 70 mol %, and particularly preferably at least 75 mol %. The upper limit on the molar content of the $Li_2M1TiO_4$ is not particularly limited, but is suitably about not more than 95% and is preferably not more than 90 mol % and particularly preferably is not more than 85 mol %.

The M1 in formula (1) is one or two or more metal elements selected from Mn, Fe, Co, and Ni. Preferred thereamong are Ni, Mn, and the two species combination of Ni and Mn, and compositions having a high content of these elements are advantageous. It is particularly advantageous for M1 to be Ni or for the Ni content to be high (for example, the Ni content in M1 is at least 50 mol %). A higher Ni content is preferred because this results in a higher discharge capacity for the lithium secondary battery fabricated using such a positive electrode active material.

The M2 in formula (2) is one or two or more metal elements selected from Mn, Co, and Ni. Combinations of any two or more of these are preferred. In particular, a combination of Mn, Co, and Ni is advantageous for this M2, whereamong $Ni_{1/3}Co_{1/3}Mn_{1/3}$ is optimal for M2.

The present invention also provides a process for producing any of the herein disclosed lithium secondary battery positive electrode active materials. This production process comprises:

a step of producing a starting material mixture slurry by mixing, with a predetermined solvent, starting materials for the formation of a solid solution between an oxide represented by the following formula (1)

$$Li_2M1TiO_4 \qquad (1)$$

(where M1 is at least one metal element selected from the group consisting of Mn, Fe, Co, and Ni)
and an oxide represented by the following formula (2)

$$LiM2O_2 \qquad (2)$$

(where M2 is at least one metal element selected from the group consisting of Mn, Co, and Ni);

a step of obtaining a precursor by evaporating the solvent from the starting material mixture slurry; and a step of calcining the precursor to obtain a lithium secondary battery positive electrode active material that contains the solid solution.

The production process of the present invention can produce a positive electrode active material optimally adapted for the fabrication of a high-capacity, low cycle deterioration lithium secondary battery.

A lithium secondary battery (typically a lithium ion secondary battery) in which the positive electrode is provided with a positive electrode active material containing any of the herein disclosed solid solutions has a high capacity and a low cycle deterioration and for this reason is equipped with properties favorable for a vehicle-mounted battery. Accordingly, the present invention provides a vehicle equipped with the herein disclosed lithium secondary battery (this can be a battery assembly configuration in which a plurality of lithium secondary batteries are connected). In particular, a vehicle (for example, an automobile) is provided in which this lithium secondary battery is installed as a power source (typically a power source for a hybrid vehicle or for an electric vehicle).

DESCRIPTION OF EMBODIMENT

Embodiments according to the present invention are described herebelow with reference to the drawings. In the description of these drawings, members and locations that perform the same function are assigned the same reference number. The dimensional relationships (length, width, thickness, and so forth) in the drawings do not reflect actual dimensional relationships. In addition, matters required for the execution of the present invention but not included within the elements particularly described in this Description (for example, the structure of and production process for the electrode assembly comprising the positive electrode and negative electrode, the structure of and production process for the separator and electrolyte, general art related to the fabrication of lithium secondary batteries and other types of batteries, and so forth) can be understood as matters of design variation for the individual skilled in the art based on the conventional art in the pertinent field.

According to an embodiment, the positive electrode active material present in the lithium secondary battery positive electrode contains a solid solution between a first oxide represented by the following formula (1)

$$Li_2M1TiO_4 \qquad (1)$$

(where M1 is at least one metal element selected from the group consisting of Mn, Fe, Co, and Ni)
and a second oxide represented by the following formula (2)

$$LiM2O_2 \qquad (2)$$

(where M2 is at least one metal element selected from the group consisting of Mn, Co, and Ni).

<The $Li_2M1TiO_4$>

The $Li_2M1TiO_4$ represented by formula (1) is a titanium composite oxide that assumes the rock salt-type crystal structure belonging to the space group Fm-3m, and M1 in formula (1) is one metal element or two or more metal elements selected from Mn, Fe, Co, and Ni. Preferred thereamong are Ni, Mn, and the two species combination of Ni and Mn, and compositions having a high content of these elements are advantageous. It is particularly advantageous for M1 to be Ni or for the Ni content to be high (for example, at least 50 mol % Ni is present in M1). A higher Ni content is preferred because this results in a higher discharge capacity for the lithium secondary battery fabricated using such a positive electrode active material.

<The $LiM2O_2$>

The $LiM2O_2$ represented by formula (2) is a lithium-transition metal composite oxide that takes on a layered rock salt-type structure, and M2 in formula (2) is one metal element or two or more metal elements selected from Mn, Co, and Ni. Combinations of any two or more of these are preferred. In particular, Mn, Co, and Ni are all advantageously present in M2, and M2 in particular is optimally $Ni_{1/3}Co_{1/3}Mn_{1/3}$.

The solid solution present in the positive electrode active material according to this embodiment is formed by the dissolution of the aforementioned $LiM2O_2$ having a layered rock salt-type structure in the aforementioned titanium composite oxide $Li_2M1TiO_4$. The proportion of dissolution of the $LiM2O_2$ in the $Li_2M1TiO_4$ should enable the $LiM2O_2$ and the $Li_2M1TiO_4$ to form a composition that is an indivisible single mass, but is not otherwise particularly limited. That is, the proportion of dissolution of the $LiM2O_2$ in the $Li_2M1TiO_4$ is selected as appropriate in conformity with the purpose of this structure. However, the molar content of the $Li_2M1TiO_4$ in the overall solid solution is preferably about at least 50 mol % and is more preferably at least 60 mol % and particularly preferably is at least 70 mol %. The upper limit on the molar content of the $Li_2M1TiO_4$ in the overall solid solution is not particularly limited, but is suitably about not more than 95% and is preferably not more than 90 mol % and particularly preferably is not more than 85 mol %.

The dissolution of $LiM2O_2$ in $Li_2M1TiO_4$ results in the introduction of Li ion diffusion channels within the original rock salt-type structure and also in the generation of electronic conductivity. As a consequence, more of the lithium in the $Li_2M1TiO_4$ can be extracted than in the absence of dissolution of the $LiM2O_2$ and the amount of lithium utilizable for charge/discharge can be increased. In addition, due to the dissolution of the $LiM2O_2$, the crystal structure is stabilized and the strains caused by Li ion insertion and extraction during charge/discharge are relaxed. This results in a lessening of the deterioration in performance associated with charge/discharge. The use of this positive electrode active material makes possible the fabrication of a high-performance lithium secondary battery that has a high capacity and that exhibits little cycle deterioration.

In the herein disclosed art, the concept that the "positive electrode active material contains a solid solution" also includes a configuration in which a compound that is not in solid solution is present for as portion of the positive electrode active material. For example, the herein disclosed positive electrode active material, while having as its the main constituent a solid solution between $LiM2O_2$ and $Li_2M1TiO_4$, may also contain for a portion thereof either or both of the oxides $LiM2O_2$ and $Li_2M1TiO_4$ as an admixed component.

The herein disclosed solid solution between $LiM2O_2$ and $Li_2M1TiO_4$ can be synthesized by solid-phase methods or liquid-phase methods. For example, taking the case of synthesis of this solid solution by a liquid-phase method, this solid solution can be produced proceeding through a step of preparing a starting material mixture slurry, a heating step, and a calcination step. Each of these processes is described in detail in the following.

<The Step of Preparing a Starting Material Mixture Slurry>

In the step of preparing a starting material mixture slurry, the starting materials (Li source, Ti source, M1 source, and M2 source) for forming the solid solution, which are selected as appropriate in conformity to the constituent elements of the above-described solid solution, are mixed with a predetermined solvent to form a starting material mixture slurry.

A single compound or two or more compounds comprising at least an Li source, a Ti source, an M1 source, and an M2 source are selected as appropriate and used as the starting material under consideration. There are no particular limitations on the Li source, Ti source, M1 source, and M2 source as long as the desired solid solution can be formed by the final calcination. For example, various salts (for example, acetate salts), hydroxides, oxides, and so forth that have the preceding as constituent elements can be selected. These may be used individually or two or more may be used in combination. As particularly preferred examples, lithium acetate, lithium carbonate, lithium hydroxide, and so forth can be selected for the Li source; nickel acetate, nickel carbonate, nickel oxide, nickel nitrate, nickel hydroxide, nickel oxyhydroxide, and so forth can be selected for the Ni source; manganese acetate, manganese carbonate, manganese oxide, manganese nitrate, manganese hydroxide, manganese oxyhydroxide, and so forth can be selected for the Mn source; cobalt acetate, cobalt carbonate, cobalt oxide, cobalt sulfate, cobalt nitrate, cobalt hydroxide, cobalt oxyhydroxide, and so forth can be selected for the Co source; iron acetate, iron carbonate, iron oxide, and so forth can be selected for the Fe source; and titanium(IV) n-butoxide, titanium oxide, titanium hydroxide, and so forth can be selected for the Ti source.

Water or a mixed solvent composed mainly of water is preferably used as the aforementioned solvent. One or two or more organic solvents (e.g., lower alcohols, lower ketones, and so forth) capable of uniformly mixing with water can be appropriately selected and used as the solvent component other than water that constitutes this mixed solvent. For example, the use is preferred of an aqueous solvent in which water is at least 80 mass % (more preferably at least 90 mass % and even more preferably at least 95 mass %) of the aqueous solvent. An aqueous solvent substantially composed of water is a particularly preferred example. Since the boiling point of water is about 100° C., heating the starting material mixture slurry to the predetermined temperature region while restraining excess solvent evaporation can be easily performed, Stirring may be performed as necessary during the preparation of the starting material mixture slurry. Suitable stirring means, for example, a magnetic stirrer, can be used for this stirring process. The time required to produce the starting material mixture slurry can be shortened by this stirring. The previously described starting materials may be completely dissolved in the starting material mixture slurry or all or a portion of the starting materials may be dispersed therein in an undissolved state.

<The Heating Step>

A precursor is obtained in the heating step by heating the starting material mixture slurry prepared as described above in order to evaporate the solvent. There are no particular limitations on the means for heating the starting material mixture slurry, and any means, e.g., a hot plate and so forth, can be used. The heating temperature will also vary depending on the solvent used. For example, when water is used as the solvent, heating must be done at a temperature at which evaporation of the water proceeds satisfactorily, and generally at least 70° C. is suitable (for example, 70 to 90° C., preferably about 75° C. to 85° C., and particularly preferably about 80° C.). The upper limit on the heating temperature should be a temperature below the boiling point of the solvent used. The heating time should be a time sufficient for the initial starting materials to react and for the precursor to undergo a satisfactory reaction and is generally about 5 to 48 hours and is preferably about 10 to 24 hours.

<The Calcination Step>

The precursor obtained as described above is calcined at 500° C. to 800° C. in the calcination step. The desired solid solution can be synthesized from the precursor by this calcination. The calcination temperature should be a temperature at which the solid solution under consideration can be synthesized, but is not otherwise particularly limited; however, the calcination temperature must be at least 500° C. in order for the reactions to proceed satisfactorily. On the other hand, when the calcination temperature exceeds 800° C., particle growth is promoted and the particle size becomes too large, making a temperature in excess of 800° C. unfavorable. 500° C. to 800° C. is generally suitable for the calcination temperature, while 550 to 700° C. is preferred and 550 to 650° C. is more preferred. The calcination time should be a time sufficient for the individual components of the precursor to undergo a uniform reaction and is generally 2 to 24 hours. There are no particular limitations on the calcination means, and any means can be used, for example, an electric oven and so forth. The calcination atmosphere is not particularly limited, and, for example, calcination may be carried out in air or an oxygen gas atmosphere which has been enriched with oxygen relative to the air. Or, as necessary calcination may be performed in an inert gas atmosphere, for example, Ar gas.

The calcination is preferably run in air or in an oxygen gas atmosphere which has been enriched with oxygen relative to the air.

As necessary, this calcination may also be divided into a plurality of stages. Thus, this calcination may be performed by carrying out a precalcination in a relatively low temperature region (for example, less than 500° C., for example 300° C. to 400° C.); then performing an interim pulverization of this precalcinate; and thereafter carrying out the main calcination in a higher temperature region (for example, 500° C. to 800° C.). This execution of the main calcination in a high temperature region after first performing a precalcination in a low temperature region can increase the uniformity of the ultimately obtained solid solution over that for calcination of the precursor in a high-temperature region (for example, 500° C. to 800° C.) from the very start. The process of pulverizing the precalcinate and recalcination may be carried out repeatedly prior to the main calcination.

The solid solution obtained by calcination as described above is preferably cooled; then pulverized by, for example, milling; and suitably classified to obtain a microparticulate solid solution having an average particle size of approximately 0.1 µm to 10 µm.

Due to the excellent electronic conductivity provided by the dissolution of the LiM2O$_2$ in the Li$_2$M1TiO$_4$, the solid solution powder obtained proceeding as described above can be used as such as a positive electrode active material without requiring the implementation of special processing (for example, a treatment that awls a composite with a carbon material) for the purpose of boosting the electronic conductivity. For example, this solid solution powder is preferably used as a constituent component of lithium secondary batteries having various configurations or as a constituent component (positive electrode active material) of an electrode incorporated within such a lithium secondary battery. In this case, other than the use of the herein disclosed solid solution powder as a positive electrode active material, lithium secondary battery fabrication can be carried out using the same processes as heretofore used.

For example, a carbon black such as acetylene black or Ketjen black or another particulate carbon material (e.g., graphite) can be mixed as a conductive material into the positive electrode active material containing the herein disclosed solid solution powder. A binder can be added in addition to the positive electrode active material and the conductive material, and this hinder can be exemplified by polyvinylidene fluoride (PVDF), styrene-butadiene rubber (SBR), polytetrafluoroethylene (PTFE), and carboxymethyl cellulose (CMC). A paste (this includes slurries and inks, and this also applies herebelow) of a composition for forming the positive electrode active material layer (also referred to herebelow as the "paste for forming the positive electrode active material layer") can be produced by dispersing the previously described components in a suitable dispersion medium and mixing and kneading. A positive electrode for a nonaqueous electrolyte secondary battery can be produced by coating a suitable amount of this paste on a positive electrode current collector (preferably formed from aluminum or an alloy whose main component is aluminum) and pressing while drying.

On the other hand, the negative electrode for the lithium secondary battery, which functions as the counterelectrode, can be produced by the same procedures as heretofore used. For example, the negative electrode active material may be any material capable of carrying out lithium insertion and extraction. A representative example is a carbon material powder composed of for example, graphite. In the same manner as for the positive electrode, this particulate material can be dispersed in a suitable dispersion medium along with a suitable binder and mixed and kneaded to produce the paste of a composition for forming the negative electrode active material layer (also referred to herebelow as the "paste for forming the negative electrode active material layer"). The negative electrode for a lithium secondary battery can be produced by coating a suitable amount of this paste on a negative electrode current collector (preferably formed from copper or nickel or alloys thereof) and pressing while drying.

The same separators as heretofore used can be used in a lithium secondary battery that uses the herein disclosed solid solution powder in its positive electrode active material. For example, a porous sheet (porous film) composed of a polyolefin resin can be used.

In addition, a nonaqueous electrolyte (typically an electrolyte solution) can be used as the electrolyte. This is typically a composition that incorporates a supporting salt in a suitable nonaqueous solvent. This nonaqueous solvent can be, for example, one or two or more selections from the group consisting of propylene carbonate (PC), ethylene carbonate (EC), diethyl carbonate (DEC), dimethyl carbonate (DMC), ethyl methyl carbonate (EMC), and so forth. The supporting salt can be, for example, one or two or more lithium compounds (lithium salt) selected from LiPF$_6$, LiBF$_4$, LiClO$_4$, LiAsF$_6$, LiCF$_3$SO$_3$, LiC$_4$F$_9$SO$_3$, LiN(CF$_3$SO$_2$)$_2$, C(CF$_3$SO$_2$)$_3$, LiI, and so forth.

There are no particular limitations on the shape (external shape and size) of the fabricated lithium secondary battery as long as the herein disclosed solid solution powder is used as a positive electrode active material. It may be a thin sheet type in which the exterior is constructed of for example, a laminate film, or may be a battery in which the external battery case has a cylindrical shape or a rectangular parallelepiped shape, or may have a small button shape.

A mode of use of the herein disclosed positive electrode is described below using the example of a lithium secondary battery that is provided with a wound electrode assembly, but this should not be taken as a limitation of the present invention to this embodiment.

Figure 1:
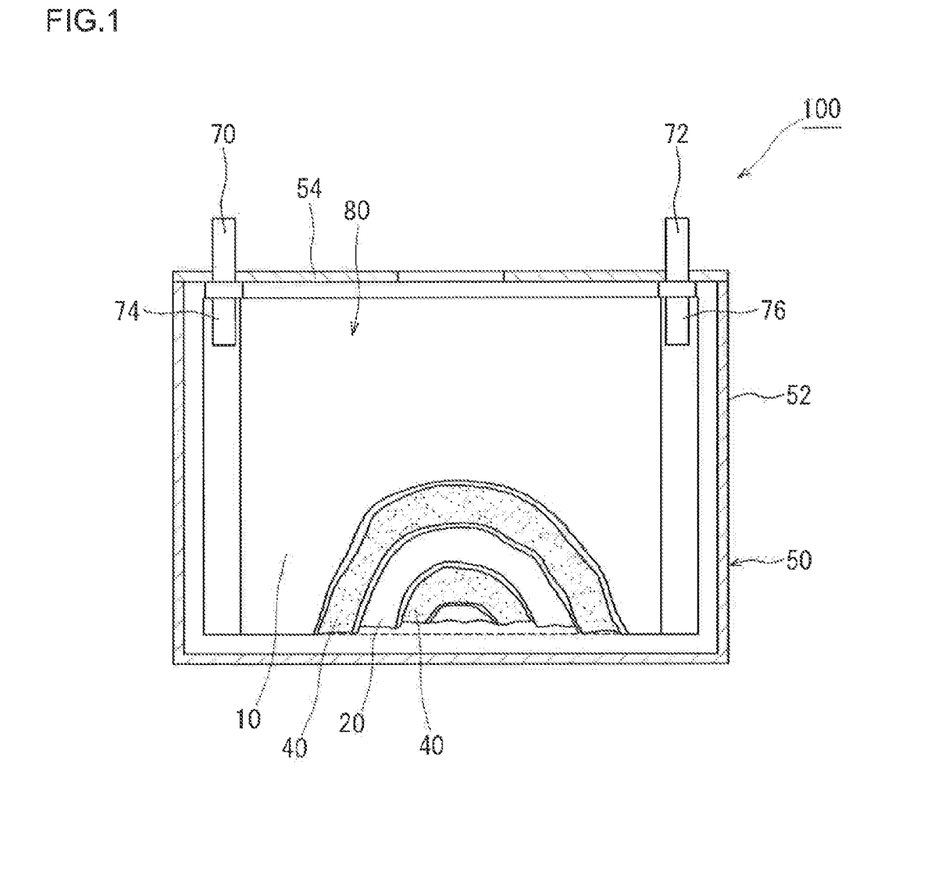
FIG. 1 is a diagram that schematically illustrates a lithium secondary battery according to an embodiment of the present invention.

As shown in FIG. 1, the lithium secondary battery 100 according to this embodiment has a structure in which an electrode assembly (a wound electrode assembly) 80—in the form of a long positive electrode sheet 10 and a long negative electrode sheet 20 wound flat with a long separator 40 interposed therebetween—is housed along with a nonaqueous electrolyte solution (not shown) in a container 50 having a shape (a flattened box shape) capable of housing the wound electrode assembly 80.

The container 50 is provided with a container main body 52, which has the shape of a flat rectangular parallelepiped that is open at the upper end, and with a lid 54 that closes off the opening. A metal such as aluminum, steel, and so forth is preferably used as the material constituting the container 50 (this is aluminum in the embodiment under consideration). Or, the container 50 may be made by molding a resin, for example, a polyphenylene sulfide resin (PPS) or a polyimide resin. At the upper side of the container 50 (that is, the lid 54), a positive electrode terminal 70 is electrically connected to the positive electrode of the wound electrode assembly 80 and a negative electrode terminal 72 is electrically connected to the negative electrode 20 of this electrode assembly 80. The interior of the container 50 houses the flattened wound electrode assembly 80 along with the nonaqueous electrolyte solution (not shown).

Figure 2:
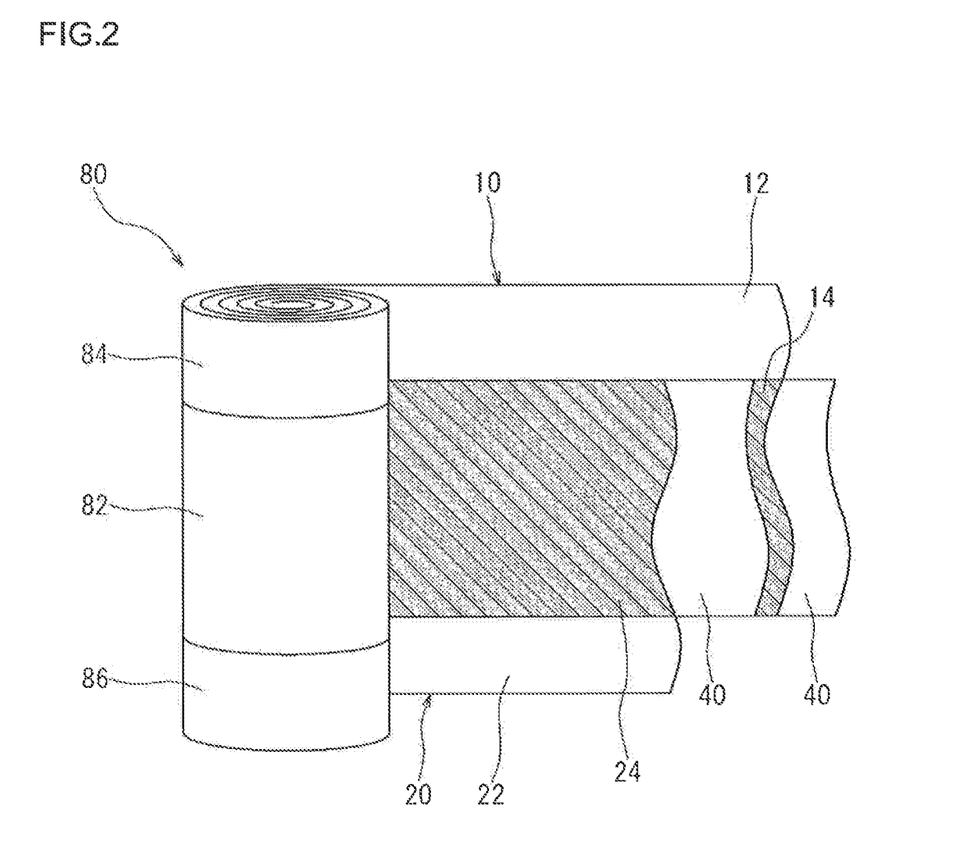
FIG. 2 is a diagram that schematically illustrates an electrode assembly in a lithium secondary battery according to an embodiment of the present invention.

Except for the use of the herein disclosed solid solution as a positive electrode active material, the materials constituting the wound electrode assembly 80 with the above-described structure and the members themselves may be the same as in the electrode assembly of a conventional lithium secondary battery and there are no particular limitations thereon. As shown in FIG. 2, the wound electrode assembly 80 according to the present embodiment has a long sheet structure (strip shape) in the stage prior to assembly of the wound electrode assembly 80.

The positive electrode sheet 10 has a structure in which a positive electrode active material layer 14 containing a positive electrode active material is held on both sides of a long sheet-like foil-shaped positive electrode current collector 12 (referred to hereafter as the "positive electrode current collector foil"). However, the positive electrode active material layer 14 is not applied to one side edge, considered in the width direction, of the positive electrode sheet 10 (the upper side edge region in the figure) in order to form a positive electrode active material layer-free region in which the positive electrode current collector 12 is exposed over a predetermined width. Just as for the positive electrode sheet 10, the negative electrode sheet 20 has a structure in which a negative electrode active material layer 24 containing a negative electrode active material is held on both sides of a long sheet-like foil-shaped negative electrode current collector 22 (referred to hereafter as the "negative electrode current collector foil"). However, the negative electrode active material layer 24 is not applied to one side edge, considered in the width direction, of the negative electrode sheet 20 (the lower side edge region in the figure) in order to form a negative electrode active material layer-free region in which the negative electrode current collector 22 is exposed over a predetermined width.

During the production of the wound electrode assembly 80, the positive electrode sheet 10 and the negative electrode sheet 20 are stacked with each other with the separator sheet 40 interposed therebetween. When this is done, the positive electrode sheet 10 and the negative electrode sheet 20 are stacked somewhat offset in the width direction so that the positive electrode active material layer-free region of the positive electrode sheet 10 and the negative electrode active material layer-free region of the negative electrode sheet 20 respectively protrude from the two sides of the separator sheet 40 considered in the width direction. The thusly layered stack is wound and the obtained winding is then pressed flat from the side surface direction to produce the flat wound electrode assembly 80.

A winding core region 82 (that is, a region in which the positive electrode active material layer 14 of the positive electrode sheet 10, the negative electrode active material layer 24 of the negative electrode sheet 20, and the separator sheet 40 are tightly stacked with each other) is formed in the central region of the wound electrode assembly 80 considered in the winding width direction. In addition, the electrode active material layer-free regions of the positive electrode sheet 10 and the negative electrode sheet 20 respectively protrude outward from the winding core region 82 at the two edges of the wound electrode assembly 80 considered in the winding width direction. A positive electrode lead terminal 74 and a negative electrode lead terminal 76 are attached, respectively, to the protrusion region 84 that is, the region in which the positive electrode active material layer 14 is not formed) on the positive electrode side and to the protrusion region 86 (that is, the region in which the negative electrode active material layer 24 is not formed) on the negative electrode side, and are also electrically connected, respectively, to the previously described positive electrode terminal 70 and negative electrode terminal 72.

The wound electrode assembly 80 with this structure is placed in the container main body 52 and a suitable nonaqueous electrolyte solution is placed (injected) into the container main body 52. Fabrication (assembly) of the lithium secondary battery 100 according to this embodiment is then completed by sealing the opening of the container main body 52 with the lid 54 by, for example, welding. The process of sealing the container main body 52 and the electrolyte solution placement (injection) process can be carried out using the same procedures as heretofore used in the production of lithium secondary batteries. Conditioning (initial charge/discharge) is then carried out on the battery. Steps such as, for example, gas removal or a quality check, may be performed as necessary.

In the test examples that follow, lithium secondary batteries (sample batteries) were fabricated using the herein disclosed solid solution powder as the positive electrode active material and their properties were evaluated. The solid solution is indicated in the following with $xLi_2M1TiO_4 \cdot (1-x)LiM2O_2$. The character "x" in the formula represents the proportion of the $Li_2M1TiO_4$ in this solid solution.

In Example 1, a solid solution was synthesized in which $Li(Ni_{1/3}Co_{1/3}Mn_{1/3})O_2$ was dissolved in $Li_2NiTiO_4$. The molar content of the $Li_2NiTiO_4$ in the overall solid solution was 80 mol % Solid solution synthesis was carried out as follows.

<0.8Li_2NiTiO_4 \cdot 0.2Li(Ni_{1/3}Co_{1/3}Mn_{1/3})O_2>

First, a starting material mixture slurry was prepared by mixing lithium acetate as the Li source, nickel acetate as the Ni source, manganese acetate as the Mn source, cobalt acetate as the Co source, and titanium(IV) n-butoxide as the Ti source in water so as to be the compositional ratios indicated above. A precursor was obtained by heating this starting material mixture slurry to approximately 80° C. and stirring in order to evaporate the water. This precursor was precalcined at 300° C. in air followed by interim pulverization and then main calcination at 600° C. The resulting calcinate was ground using a ball mill to a suitable particle diameter to obtain a powder of $0.8LiNiTiO_4 \cdot 0.2Li(Ni_{1/3}Co_{1/3}Mn_{1/3})O_2$.

<0.8Li_2MnTiO_4 \cdot 0.2Li(Ni_{1/3}Co_{1/3}Mn_{1/3})O_2>

A solid solution of $Li(Ni_{1/3}Co_{1/3}Mn_{1/3})O_2$ dissolved in $Li_2MnTiO_4$ was synthesized in Example 2. The molar content of the $Li_2MnTiO_4$ in the overall solid solution was 80 mol %. The synthesis was carried out as in Example 1, except for changing the molar ratios among the source materials so as to obtain $0.8Li_2MnTiO_4 \cdot 0.2Li(Ni_{1/3}Co_{1/3}Mn_{1/3})O_2$.

In Example 3, a solid solution was synthesized in which $Li(Ni_{1/3}Co_{1/3}Mn_{1/3})O_2$ was dissolved in $Li_2FeTiO_4$. The molar content of the $Li_2FeTiO_4$ in the overall solid solution was 80 mol %. Iron acetate was used as the Fe source. The synthesis was carried out as in Example 1, except for changing the molar ratios among the source materials so as to obtain $0.8Li(Ni_{1/3}Co_{1/3}Mn_{1/3})O_2$.

In Comparative Example 1, $Li_2NiTiO_4$ was synthesized without solid dissolution of the $Li(Ni_{1/3}Co_{1/3}Mn_{1/3})O_2$. The synthesis was carried out as in Example 1, except for changing the molar ratios among the source materials so as to obtain $Li_2NiTiO_4$, In Comparative Example 2, $Li_2MnTiO_4$ was synthesized without solid dissolution of the $Li(Ni_{1/3}Co_{1/3}Mn_{1/3})O_2$. The synthesis was carried out as in Example 2, except for changing the molar ratios among the source materials so as to obtain $Li_2MnTiO_4$.

In Comparative Example 3, $Li_2FeTiO_4$ was synthesized without solid dissolution of the $Li(Ni_{1/3}Co_{1/3}Mn_{1/3})O_2$. The synthesis was carried out as in Example 3, except for changing the molar ratios among the source materials so as to obtain $Li_2FeTiO_4$.

<Fabrication of the Positive Electrode Sheet>

The particular solid solution powder (positive electrode active material) obtained in Examples 1 to 3 and Comparative Examples 1 to 3 as described above, carbon black as the conductive material, and polyvinylidene fluoride (PVDF) as the binder were weighed out to provide them in a mass ratio of 80:15:5 and were mixed to uniformity in N-methylpyrrolidone (NMP) to yield the paste of a composition for forming the positive electrode active material layer. This paste composition for forming the positive electrode active material layer was coated in layer form on one side of an aluminum foil (positive electrode current collector: thickness=15 μm) and was dried to yield a positive electrode sheet having a positive electrode active material layer disposed on one side of the positive electrode current collector.

<Fabrication of the Negative Electrode Sheet>

SBR as the binder was weighed into a natural graphite powder as the negative electrode active material to provide a mass ratio of graphite:SBR to be 98:2, and mixing to uniformity in water was carried out to produce the paste of a composition for forming the negative electrode active material layer. This paste composition for forming the negative electrode active material layer was coated in layer form on one side of a copper foil (negative electrode current collector: thickness=10 μm) and was dried to yield a negative electrode sheet having a negative electrode active material layer disposed on one side of the negative electrode current collector.

<Coin Cell Fabrication>

Figure 3:
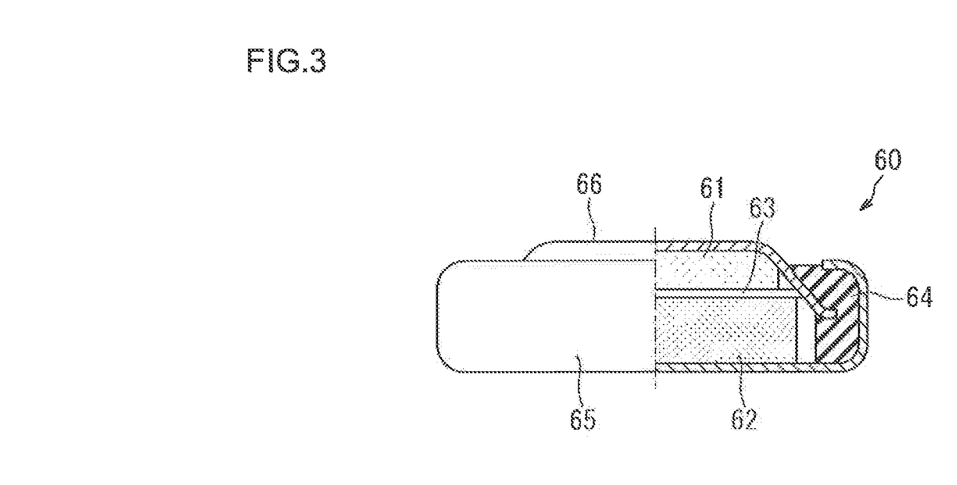
FIG. 3 is a diagram that schematically illustrates a test coin cell according to test examples herein.

The positive electrode sheet obtained as described above was punched into a circle with a diameter of 16 mm to fabricate a pellet-shaped positive electrode. The aforementioned negative electrode sheet was punched into a circle with a diameter of 19 mm to fabricate a pellet-shaped negative electrode. This positive electrode and negative electrode and a separator (a trilaminar structure of polypropylene (PP)/polyethylene (PE)/polypropylene (PP)) porous sheet having a diameter of 19 mm and a thickness of 0.02 mm was used) were inserted into a stainless steel container along with a nonaqueous electrolyte solution to fabricate a coin cell 60 (half cell for evaluating the charge/discharge performance) as shown in FIG. 3 having a diameter of 20 mm and a thickness of 3.2 mm (2032 type). In FIG. 3, reference number 61 indicates the positive electrode; reference number 62 indicates the negative electrode; reference number 63 indicates a separator impregnated with an electrolyte solution; reference number 64 refers to a gasket; reference number 65 refers to a container (negative electrode terminal); and reference number 66 refers to a lid (positive electrode terminal). The nonaqueous electrolyte solution was a mixed solvent containing ethylene carbonate (EC) and dimethyl carbonate (WC) in a 1:1 volume ratio, and incorporated $LiPF_6$ as a supporting salt at a concentration of about 1 mol/liter. The lithium secondary battery (test coin cell) 60 was fabricated proceeding in this manner.

<The Initial Discharge Capacity>

Each of the test coin cells prepared as described above was subjected to 50 charge/discharge cycles on a continuous basis as follows: operating at a temperature of 25° C., charging using a constant-current, constant voltage procedure at a current of 0.5 C and a voltage of 4.8 V until the total charging time reached 3 hours, then discharging to 2.5 V at a constant current of 0.5 C. The capacity retention rate after 50 cycles was calculated from the discharge capacity in the 1st cycle (initial discharge capacity) and the discharge capacity in the 50th cycle ("discharge capacity in the 50th cycle/discharge capacity in the 1st cycle (initial discharge capacity)"×100). The results are given in Table 1.

TABLE 1

| | Positive Electrode Active Material | Initial Discharge Capacity (mAh) | Discharge Capacity after 50 Cycles (mAh) | Capacity Retention Rate (%) |
|---|---|---|---|---|
| Example 1 | $0.8Li_2NiTiO_4 + 0.2Li(Ni_{1/3}Co_{1/3}Mn_{1/3})O_2$ | 1.55 | 1.05 | 68 |
| Example 2 | $0.8Li_2MnTiO_4 + 0.2Li(Ni_{1/3}Co_{1/3}Mn_{1/3})O_2$ | 1.45 | 0.91 | 63 |
| Example 3 | $0.8Li_2FeTiO_4 + 0.2Li(Ni_{1/3}Co_{1/3}Mn_{1/3})O_2$ | 1.25 | 0.82 | 66 |
| Comp. Example 1 | $Li_2NiTiO_4$ | 1.03 | 0.35 | 34 |
| Comp. Example 2 | $Li_2MnTiO_4$ | 0.24 | 0.02 | 8 |
| Comp. Example 3 | $Li_2FeTiO_4$ | 0.19 | 0.01 | 5 |

As is clear from Table 1, the batteries according to Comparative Examples 1 to 3, which employed $Li_2M1TiO_4$ without the formation of a solid solution with $Li(Ni_{1/3}Co_{1/3}Mn_{1/3})O_2$, had a low initial discharge capacity and also exhibited deterioration in the capacity retention rate after the repetition of 50 charge/discharge cycles.

In contrast to this, the batteries according to Examples 1 to 3, which employed $Li_2M1TiO_4$ in which $Li(Ni_{1/3}Co_{1/3}Mn_{1/3})O_2$ was dissolved in solid solution, had a higher initial discharge capacity than the batteries of Comparative Examples 1 to 3 and also had a substantially improved capacity retention rate after the repetition of 50 charge/discharge cycles. Based on these results, it could be confirmed that a high-capacity, low cycle deterioration lithium secondary battery was provided by the use of $xLi_2M1TiO_4 \cdot (1-x)LiM2O_2$ in which $LiM2O_2$ is present in solid solution in $Li_2M1TiO_4$.

For the lithium secondary batteries tested here, a high initial discharge capacity of at least 1.45 mAh could be achieved by using Ni or Mn for the "M1" in the $Li_2M1TiO_4$ (Examples 1 and 2). In particular, a very high initial discharge capacity of at least 1.55 mAh could be achieved by using Ni for the "M1" in the $Li_2M1TiO_4$ (Example 1). Viewed from the perspective of raising the initial discharge capacity, the use of Ni and/or Mn for the "M1" in $Li_2M1TiO_4$ is thus desirable.

In addition, for the lithium secondary batteries tested here, a high capacity retention rate of at least 66% could be achieved by using Ni or Fe for the "M1" in the $Li_2M1TiO_4$ (Examples 1 and 3). In particular, a very high capacity retention rate of at least 68% could be achieved by using Ni for the "M1" in the $Li_2M1TiO_4$ (Example 1). Viewed from the perspective of raising the capacity retention rate, the use of Ni and/or Fe for the "M1" in $Li_2M1TiO_4$ is thus desirable.

The present invention has been described in the preceding using suitable embodiments, but this description is not limiting material and various modifications are of course possible.

Figure 4:
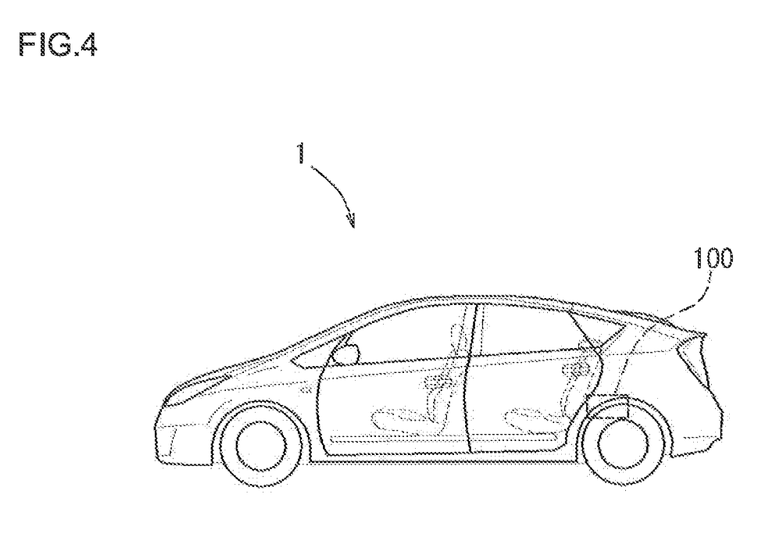
FIG. 4 is a schematic side view of a vehicle equipped with a lithium secondary battery according to an embodiment of the present invention.

All of the herein disclosed lithium secondary batteries 100, because they exhibit a high capacity and a low cycle deterioration as described above, have favorable properties for use as a vehicle-mounted battery. Accordingly, the present invention provides a vehicle 1 that is equipped with the herein disclosed lithium secondary battery 100 (this can be a battery assembly configuration in which a plurality of lithium secondary batteries are connected, as shown in FIG. 4. In particular, a vehicle (for example, an automobile) is provided in which this lithium secondary battery is installed as a power source (typically a power source for a hybrid vehicle or for an electric vehicle).

INDUSTRIAL APPLICABILITY

According to the present invention, a positive electrode active material can be provided that exhibits a high capacity and little performance deterioration and that has $Li_2M1TiO_4$ incorporated in the positive electrode. Thus, a lithium secondary battery having a high capacity and excellent cycle characteristics can be provided by using this positive electrode active material.

The invention claimed is:

1. A lithium secondary battery, comprising:
   a positive electrode including a solid solution, having a crystal structure belonging to a space group Fm-3m, comprising
   a first oxide represented by the following formula (1)

$$Li_2M1TiO_4 \qquad (1)$$

where M1 is at least one metal element selected from the group consisting of Mn, Fe, Co, and Ni, and
   a second oxide represented by the following formula (2)

$$LiM2O_2 \qquad (2)$$

where M2 is at least one metal element selected from the group consisting of Mn, Co, and Ni; and
   a negative electrode.

2. The lithium secondary battery according to claim 1, wherein
   a molar content of the first oxide represented by formula (1) is at least 50 mol % of the overall solid solution.

3. The lithium secondary battery according to claim 1, wherein
   the first oxide represented by formula (1) has Ni as the M1.

4. The lithium secondary battery according to claim 1, wherein
   the second oxide represented by formula (2) has Mn, Co, and Ni as the M2.

5. The lithium secondary battery according to claim 4, wherein
   the M2 in the second oxide represented by formula (2) is $Ni_{1/3}Co_{1/3}Mn_{1/3}$.

6. A lithium secondary battery positive electrode, comprising:
   a solid solution, having a crystal structure belonging to a space group Fm-3m, comprising
   a first oxide represented by the following formula (1)

$$Li_2M1TiO_4 \qquad (1)$$

where M1 is at least one metal element selected from the group consisting of Mn, Fe, Co, and Ni, and
   a second oxide represented by the following formula (2)

$$LiM2O_2 \qquad (2)$$

where M2 is at least one metal element selected from the group consisting of Mn, Co, and Ni.

7. A lithium secondary battery positive electrode active material, comprising:
   a solid solution, having a crystal structure belonging to a space group Fm-3m, comprising a first oxide represented by the following formula (1)

$$Li_2M1TiO_4 \qquad (1)$$

where M1 is at least one metal element selected from the group consisting of Mn, Fe, Co, and Ni, and
   a second oxide represented by the following formula (2)

$$LiM2O_2 \qquad (2)$$

where M2 is at least one metal element selected from the group consisting of Mn, Co, and Ni.

8. A method for producing a lithium secondary battery positive electrode active material, comprising:
   mixing starting materials for a solution, having a crystal structure belonging to a space group Fm-3m, comprising a first oxide and a second oxide with a predetermined solvent to prepare a starting material mixture slurry, the first oxide represented by the following formula (1)

$$Li_2M1TiO_4 \qquad (1)$$

where M1 is at least one metal element selected from the group consisting of Mn, Fe, Co, and Ni,
   and the second oxide represented by the following formula (2)

$$LiM2O_2 \qquad (2)$$

where M2 is at least one metal element selected from the group consisting of Mn, Co, and Ni;
   evaporating the solvent from the starting material mixture slurry to obtain a precursor; and
   calcining the precursor to obtain a lithium secondary battery positive electrode active material including the solid solution.

* * * * *